Aug. 24, 1948.  M. C. DEPP ET AL  2,447,496
FLUX VALVE SYSTEM AND METHOD OF OPERATION
Filed Feb. 3, 1944  2 Sheets-Sheet 1
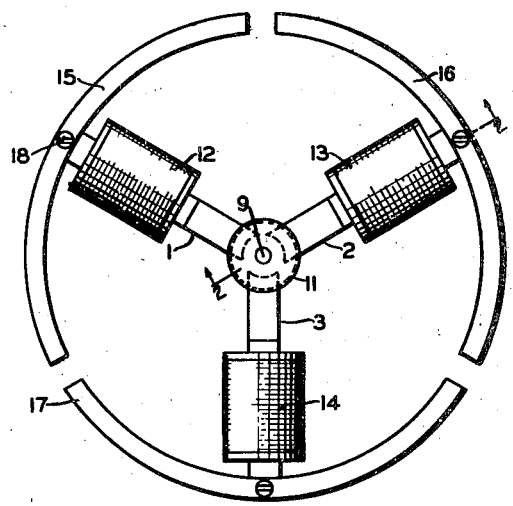
FIG.1
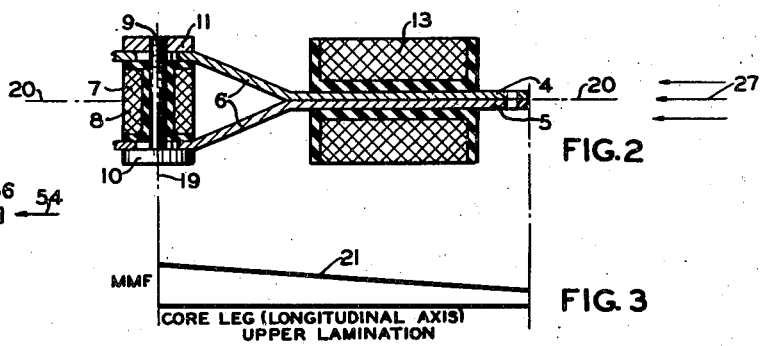
FIG.2
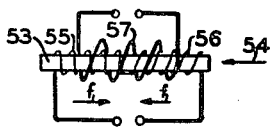
FIG.14
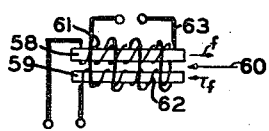
FIG.15
FIG.3
FIG.4
FIG.5
INVENTORS:
MARLIN C. DEPP
ROBERT S. CURRY JR.
CAESAR F. FRAGOLA
THEIR ATTORNEY.

Aug. 24, 1948.  M. C. DEPP ET AL  2,447,496
FLUX VALVE SYSTEM AND METHOD OF OPERATION
Filed Feb. 3, 1944  2 Sheets-Sheet 2

INVENTORS:
MARLIN C. DEPP
ROBERT S. CURRY, JR.
CAESAR F. FRAGOLA
BY
ATTORNEY.

Patented Aug. 24, 1948

2,447,496

UNITED STATES PATENT OFFICE 2,447,496

FLUX VALVE SYSTEM AND METHOD OF OPERATION

Marlin C. Depp, Hempstead, Robert S. Curry, Jr., Baldwin, and Caesar F. Fragola, East Hempstead, N. Y., assignors to The Sperry Corporation, a corporation of Delaware Application February 3, 1944, Serial No. 520,880

1 Claim. (Cl. 177—351)

Our invention particularly relates to a novel flux valve embodied in a flux valve or compass system, and to a novel method of exciting the flux valve and its associated system having, for example, repeaters embodied therein.

The term "flux valve," as herein employed, is descriptive of those devices which are sensitive to an external unidirectional magnetic field and supplies output signal voltages which are dependent in amplitude and in phase upon the position of the device with respect to the direction of the external field. Essentially, flux valves comprise a core of permeable magnetic material in which flux is pulsed, or periodically varied, whereby to cause the flux of the external magnetic field to pulsate or periodically vary. A pick-up winding disposed about the core has signal voltages induced therein by the pulsating, varying flux of the external field. Ordinarily, an exciting winding is employed in association with the core and connected to a suitable source of alternating current to produce the periodically varying exciting flux in the core.

Where a full wave alternating current is used in exciting the flux valve, the signal voltage output thereof, or the voltage induced in the pick-up coil through interaction with the external field, is characterized by the fact that its frequency is double that of the current source employed in exciting the valve. Since a double frequency signal voltage is produced through interaction with the external field, it is this voltage component which will vary in magnitude or amplitude with changes in the position of the valve core relative to the external field, and, substantially as a cosinusoidal function of the angle between the longitudinal axis of the core of the valve and the direction of the external field, and change in phase will occur when the axis of the core is reversed in its position in the external field.

Since the above pointed out double frequency signal voltage output of the flux valve is a measure of the relationship thereof in an external field, it is very desirable to eliminate from the output any voltage components corresponding to the fundamental, or of a frequency equal to that of the source of alternating current used in exciting the valve because any voltage outputs from the flux valve which are of a fundamental frequency, or odd harmonics thereof, are not necessarily dependent upon the position of the valve with respect to the external field, and, therefore, constitute purely error signals or components appearing in the output of the flux valve which distort the desired output components.

Furthermore, in compass systems embodying flux valves which function in the foregoing manner and a repeater, a frequency doubler or some suitable device should be employed to excite the repeater at a frequency corresponding to the double frequency, signal voltage outputs of the flux valve.

It is, therefore, the primary object of our invention to provide a flux valve system which is so constructed and arranged and excited in such a manner that the signal voltage output of the flux valve, that is, the voltage outputs which are induced therein through interaction with the external field, are of the same frequency as that of the source of alternating current used in exciting the valve. Hence, in the system of the present invention, the necessity of frequency doubling is eliminated and the undesirable presence of fundamental voltage components in the output of the flux valve is substantially obviated or, at least, its effectiveness in producing error in the signal voltages is greatly reduced.

More particularly, it is an object to provide in the system of the present invention a flux valve of such character that when placed with the longitudinal axis of the core thereof, for example, in a horizontal plane in the earth's field and when excited with half wave, rectified alternating current or pulsating current, the core will not experience any materially appreciable resultant magnetization having a component in the said horizontal plane whereby magnetic symmetry of the valve about its geometric center results.

It is also an object of the present invention to provide a system having a flux valve in which the exciting coil is arranged normal to the longitudinal axis of the core and is excited by means of half wave, rectified alternating current, the exciting coil and the core being so constructed and relatively arranged that the magnetic symmetry of the valve about its geometric center is not impaired by this type of excitation.

Still more particularly, it is an object of our invention to provide a system having a three-legged flux valve, the legs of which extend radially with respect to each other and comprise laminations which extend, over the major portion of the length of the legs, in contiguous, superimposed relationship, but are spaced apart adjacent the center of the flux valve to form bifurcations between all of which an exciting core and coil are secured with the exciting core lying normal to the legs as a common means for exciting all of the legs of the flux valve, the system including means for supplying half-wave, rectified alternating current to said exciting coil.

With the foregoing and still other objects in view, our invention includes the novel correlation and arrangement of parts together with the novel manner of exciting the flux valve or flux valve compass system of our invention described below and illustrated in the accompanying drawings, in which:

Fig. 1 is a plan view of a preferred form of flux valve employed in the present invention;

Fig. 2 is a fragmentary, elevation view, of one leg of the flux valve taken in about the plane 2—2 of Fig. 1;

Figs. 3, 4 and 5 represent approximate magnetomotive force gradient curves for the laminations of the core leg of Fig. 2;

Figure 7:
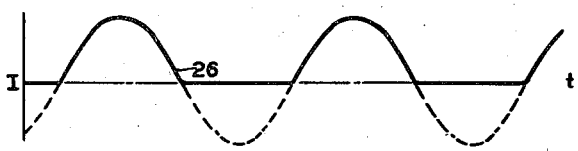
Figure 8:
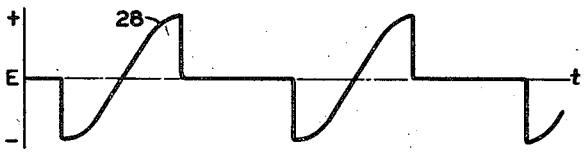
Figure 9:
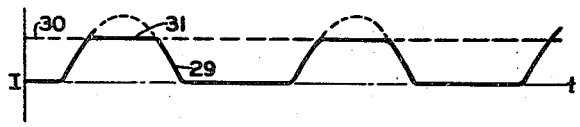
Figure 10:
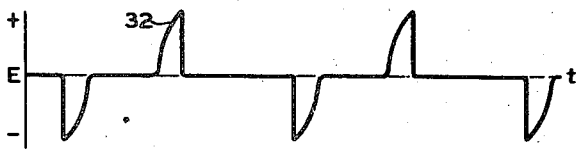
Figure 11:
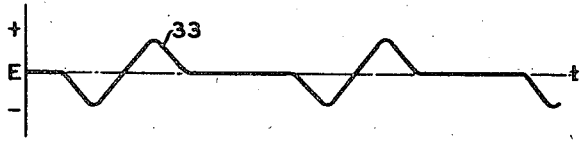
Figure 12:
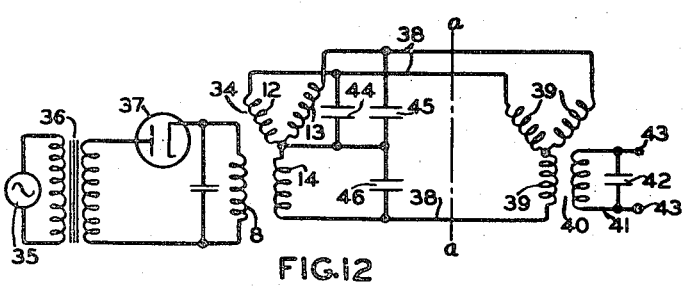
Figure 13:
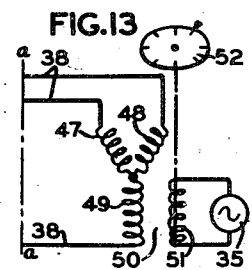

Figs. 7 and 9 disclose exciting current curves;

Figs. 8, 10 and 11 disclose induced voltage curves;

Fig. 12 is a wiring diagram of a flux valve system of the present invention;

Fig. 13 is a modification of the system of Fig. 12; and

Figs. 14 and 15 are schematic representations of modifications.

In accordance with our invention, we propose to supply pulsating D. C. or half-wave, rectified alternating current to excite a flux valve whereby the signal voltage output from the pickup windings thereof will be of the same frequency as that of the source of current employed in exciting the valve.

It is to be noted that half-wave rectified current, or a pulsating direct current, cannot advantageously be used in accordance with the teachings of the present invention substantially to eliminate the undesirable fundamental frequency component or to reduce its effectiveness in producing error in the signal voltage output and to provide a signal voltage of fundamental frequency with all types and constructions which are possible in the fabrication of flux valves where, for example, the flux valve is to be used in a compass system. For example, in order that the flux valve may be used accurately to provide direction indications in azimuth, the signal voltage output should vary substantially as a cosinusoidal function of the angle between the longitudinal axis of the core leg or the axis of the pick-up coil and the direction of an external unidirectional magnetic field or the earth's field. Accordingly, the method of excitation or the character of the exciting current must not be such as to affect the otherwise magnetic symmetry of the valve. By the term "magnetic symmetry" we mean to indicate that the valve for all azimuthal positions thereof in the earth's field will offer substantially the same reluctance or permeance to the external field and therefore that the amplitudes of the signal voltage output will not materially differ when the valve lies in one position or another 180° removed in azimuth therefrom and for intermediate positions the output will vary cosinusoidally in amplitude as above explained.

It should be noted that, for example, where exciting current is supplied to a coil surrounding a flux valve core leg and the use of half-wave rectified exciting current produces, by virtue of the coil and core arrangement, a unidirectional flux flow in the core, a magnetomotive force difference between opposite ends of the core leg or resultant magnetization longitudinally thereof results. A flux valve of this type cannot well be used in a compass system since magnetization of the core leg in the above manner with the longitudinal axis of the core lying in a horizontal plane in the earth's field definitely destroys the otherwise magnetic symmetry of the core leg. It is clear to see that with a valve of this type, more lines of force from the external field will thread the core of the valve when in one position than will thread the core when it is oriented through 180° to a second position.

Therefore, in accordance with our present invention, we employ a flux valve which is so constructed and arranged that the exciting non-reversing magnetomotive force, which is applied thereto, will produce no resultant magnetization in the core having a component paralleling the direction of the field or in the horizontal plane of the earth's field, or, if polarization of the core occurs, lines joining opposite poles will lie normal to the longitudinal axis of the core or that portion of the core about which the pick-up windings extend.

For example, we propose to supply pulsating direct current or half-wave, rectified alternating current to the exciting windings, where these windings are mounted on the cores with their axes in a horizontal plane in the earth's field, as shown in Figs. 14 and 15, in such manner that horizontal components of any resultant magnetization are cancelled through the bucking relationship of the magnetomotive forces. As a further example, if the core leg is considered as extending in a horizontal plane, we propose to apply in the preferred, exemplary embodiment of our invention an exciting magnetomotive force thereto in a vertical direction, whereby the difference between opposite poles produced by the periodic half-wave exciting current is measurable only in a vertical direction and not lengthwise of the core. In this manner, we provide for half-wave excitation without substantially affecting the otherwise magnetic symmetry of the flux valve in the plane of the flux valve or in a horizontal plane in the earth's field.

In the preferred construction of flux valve employed in the present invention and illustrated in Figs. 1 and 2, the flux valve comprises three radially extending core legs 1, 2 and 3, arranged preferably at equal angles, one with respect to the other. Each core leg, as illustrated in Fig. 2, comprises a pair of laminations 4 and 5 which, for the major portion of their length, extend from the outer ends of the legs in contiguous, superimposed relationship toward the geometric center of the valve. These laminations are outwardly bent in opposite directions, as shown, to form the bifurcation 6. The free ends of the bifurcation are also bent slightly inwardly to lie in parallel spaced relation, whereby they may be secured adjacent opposite ends of an exciting core and coil indicated generally at 7. In the embodiment illustrated, the core 9 serves the additional function of forming one element of a means for clamping the spaced inner ends of all three core legs adjacent opposite ends of the exciting core and coil at the center of the valve. In other words, the core 9, surrounded by the exciting coil 8 is screw-threaded at one end and is formed at the other end with a head 10. The lower laminations of the core legs are clamped between the head of the core 9 and the spool carrying exciting coil 8, while the upper laminations are clamped adjacent the other end of the spool by means of the nut 11. Pickup windings 12, 13 and 14 are mounted about the superimposed contiguously extending laminations of the core legs 1, 2 and 3, respectively, and collector rings 15, 16 and 17 may be fastened as by means of bolts 18 to the respective outer ends of the core legs.

In accordance with our invention, current from an alternating source, as illustrated in Fig. 12, is supplied through a half-wave rectifier to supply half-wave only, alternating current to the exciting coil 8, which serves as a common means for supplying an exciting, pulsating, non-reversing flux to all of the core legs. It will be noted that the axis 19 of the exciting core 9 and the coil 8 lies normal to the longitudinal axis 20 of the core leg. Hence, we may assume, as illustrated in Fig. 3, that the exciting current will produce a magnetomotive force in the upper lamination 4 having a gradient measured along the longitudinal axis of the core leg from the center of the valve to the outer end of the core leg which conforms to the curve 21. With the foregoing assumption, the magnetomotive force gradient curve for the lower lamination 5 of the core leg will be of the character indicated by the curve 22 in Fig. 4. The resultant of these curves is represented by the gradient curve 23 of Fig. 5. By this latter curve, it will be seen that the magnetomotive force difference, measured crosswise of the core leg or in a direction normal to the longitudinal axis 20 thereof, substantially uniformly diminishes from a maximum value at the center of the valve to zero value at the outer end of the core legs. Under these conditions, residual or permanent magnetism is measurable only in a direction normal to the legs and, hence, will have substantially the same effect on an external unidirectional field for all positions of the core legs within said field where the planes including all of the core legs parallel the direction of the external field.

Figure 6:
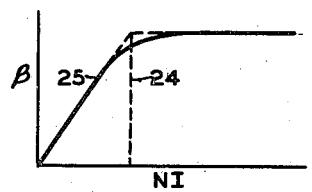
Fig. 6 represents a magnetization curve of the core legs.

A magnetization curve, in which flux density is plotted against magnetomotive force or ampere turns, for the core legs, is illustrated in Fig. 6, the intersection of the dash line 24 with the curve 25 being indicative of the saturation point on the curve. The halfwave rectified current employed in exciting the valve is indicated in Fig. 7 by the curve 26, the assumption being that the positive half of the cycle is employed for excitation purposes while the negative half is rejected.

We will assume that the direction of the external field to which the flux valve is subjected is as represented by the arrows 27 in Fig. 2 and that under this condition the flux in the upper lamination 4 induces a signal voltage component in pick-up coil 13 without saturation and that, similarly, a voltage component is also induced in the pickup coil by the flux of the external field, but with saturation of the lower lamination. The curve in Fig. 8, indicated by the numeral 28, represents the voltage induced in the pick-up coil by the flux of the external field in the upper lamination. Since the voltage so induced in the pick-up coil is proportional to the rate of change of flux in the core associated therewith, that is, it follows the equation:

$$e = -N\frac{d\phi}{dt}$$

maximum voltage will be induced at the point where the exciting current starts building up from zero or reduces to zero. Therefore, this induced voltage will have an alternation including both positive and negative pulses for each pulse of the exciting current.

As above assumed, the voltage induced in the pick-up core by the flux in the lower lamination is affected by saturation of the core. Hence, in Fig. 9 we have shown the curve 29 which discloses the effect of saturation on the exciting current, or, this curve may be considered as a representation of the flux in the lower lamination. The dash line 30 conforms to dash line 24 in Fig. 6, and represents the saturation point of the core lamination. The exciting current or flux will, therefore, pulse in a manner generally similar to that shown in Fig. 7, but the tops of the positive half cycles will be cut off as indicated at 31. By virtue of this saturation effect, the voltage induced in the pick-up coil by the flux of the external field will have the appearance represented by the curve 32 in Fig. 10. The manner of formation of a voltage wave of this character is believed apparent from the foregoing description directed to the curve of Fig. 8. The two voltage curve lines induced in the pick-up coil and represented by the curves in Figs. 8 and 10 will be of opposite sign and will add algebraically together to form the resulting voltage curve indicated at 33 in Fig. 11. By the use of suitable condensers or equivalent circuit elements, the resultant voltage curve 33 may be spread out or distorted so as to approximate a sign wave.

It will be observed that the signal voltage output from the pick-up coils of the flux valve, when the valve is excited as hereinabove described, will be of the same frequency as that of the source of alternating current supplied to the exciting winding. Therefore, the signal voltages produced through interaction between the flux valve and the external magnetic field are of fundamental frequency, rather than of double frequency, as compared to the exciting source of current. Hence, in control circuits associated therewith, and in flux valve compass systems wherein a repeater reproduces an indication of the direction of an external field with respect to the flux valve, the control or repeater being of a phase-sensitive nature, it is unnecessary to provide any means such as a frequency-doubler in order that the phase-sensitive control or repeater may be excited by a current having a frequency the same as that of the signal voltages produced by the flux valve. Furthermore, since the signal voltage outputs are of fundamental frequency, as compared to double frequency, the harmful effects of components in the signal voltage outputs of the flux valve, which correspond in frequency to that of the exciting current, are substantially eliminated.

In Figs. 12 and 13, we have illustrated systems wherein the flux valve is connected either to a control circuit including a synchro-transformer or to a position repeater or remote compass indicator. In Fig. 12, the flux valve indicated generally at 34 comprises the exciting coil 8 and pick-up windings 12, 13 and 14. Exciting current is supplied from the source of alternating current 35 through transformer 36 and half-wave rectifier 37 to the exciting coil 8. The pick-up windings 12, 13 and 14 may be Y-connected as illustrated or in any other desirable symmetrical arrangement such as in delta and connected through conductors 38 to similarly connected polyphase windings 39 of the synchro-transformer indicated generally at 40. The single phase winding 41 of transformer 40 may be tuned by means of condenser 42 to the frequency of the signal voltage outputs of the flux valve which is that of the alternating current source 35. The winding 41 is connected across output taps 43 to supply the signal voltage generated therein to any suitable circuit connected across the output taps. In the embodiment shown in Fig. 12, we have illustrated condensers 44, 45 and 46 connected respectively across the pick-up windings 12, 13 and 14 of the flux valve. These condensers serve to convert the signal voltage outputs substantially to voltage waves of sinusoidal form. It is advantageous to use a smoothing circuit in the excitation circuit of the flux valve, this simplifies the problem of filtering the output.

In Fig. 13 is illustrated a system of our invention wherein a repeater is connected as a compass indicator with the flux valve. It will be understood that the dot-dash line a—a in Figs. 12 and 13 serves to indicate the points of connection of the repeater shown in Fig. 13 to the output of the flux valve 34, the repeater being a substitution for the synchro-transformer. In other words, the output voltages in the flux valve 34 are supplied by means of conductors 38 to the polyphase windings 47, 48 and 49 of the repeater 50 in a manner similar to that in which they are supplied to the synchro-transformer of Fig. 12. In this latter case, however, the single phase winding 51 of the repeater is free to rotate and carries with it a compass card such as indicated at 52. Furthermore, alternating current or a reference current is supplied to the single phase winding 51 of the rotor of the repeater. Heretofore, it has been necessary to supply this current from a suitable frequency-doubler, which is connected with the source of current employed in exciting the valve. In our present invention, the winding 51 of the repeater may be connected directly with the source 35 of alternating current used in exciting the flux valve. This is possible, as hereinbefore set forth, since the repeater is rendered phase-sensitive by supplying an exciting current thereto of the same frequency as the signal voltage outputs of the flux valve and these voltage outputs are of the same frequency as the source of current employed in exciting the valve.

In Fig. 14, the core 53 adapted to parallel the direction of an external unidirectional field indicated by arrow 54 has opposing exciting windings 55 and 56 surrounding the core which in turn are surrounded by pick-up winding 57. In Fig. 15, two core members 58 and 59, herein shown as arranged in adjacent parallel relationship, are adapted to lie with their longitudinal axes in horizontal planes in the earth's field represented by arrow 60. The exciting windings 61 and 62 cause flux to flow in directions represented by the arrows or in opposite directions whereby to cancel out all components of polarization in horizontal planes. The pick-up winding 63 surrounds both cores and exciting windings. In Fig. 14, the windings 55 and 56 pulse flux in opposing relation in the single core 53 whereby, in a similar manner, to cancel polarization components in the horizontal plane. In accordance with our invention, pulsating unidirectional current is supplied to the exciting windings as heretofore described in connection with the embodiment of our invention illustrated in Fig. 2.

While we have described our invention in its preferred embodiments, it is to be understood that the words which we have used are words of description, rather than of limitation, and that changes may be made within the purview of the appended claim without departing from the true scope and spirit of our invention in its broader aspects.

What is claimed is:

A flux valve compass system including a flux valve comprising a plurality of relatively radially arranged core legs of permeable magnetic material having their longitudinal axes extending in substantially co-planar relation and bifurcated at their inner ends, a common exciting core extending perpendicular to the longitudinal axes of said legs and interposed between the bifurcated ends of each, an exciting coil on said exciting core and pick-up coils on said core legs positioned outwardly beyond the bifurcated ends thereof, a source of alternating current, a half-wave rectifier connected to said source and with said exciting coil to supply half-wave only exciting current thereto, said valve being characterized by the fact that its signal voltage output is of the same frequency as said alternating current source, and a receiver connected for control by the signal voltages developed in said pick-up coils and energized with currents of the same frequency as that of said current source, whereby a phase-sensitive operation of said receiver at the frequency of the flux valve-exciting current is effected with substantially zero resultant permanent polarization of the flux valve legs to thereby provide accurate compass indications throughout 360°.

MARLIN C. DEPP.
ROBERT S. CURRY, Jr.
CAESAR F. FRAGOLA.

REFERENCES CITED

The following references are of record in the file of this patent:

UNITED STATES PATENTS

| Number | Name | Date |
|---|---|---|
| 1,886,336 | Gunn | Nov. 1, 1932 |
| 2,047,609 | Antranikian | July 14, 1936 |
| 2,176,101 | Riggs | Oct. 7, 1939 |
| 2,373,096 | Bonell | Apr. 10, 1945 |
| 2,383,460 | Purves et al. | Aug. 28, 1945 |
| 2,383,461 | Esval et al. | Aug. 28, 1945 |

FOREIGN PATENTS

| Number | Country | Date |
|---|---|---|
| 451,850 | Great Britain | Aug. 10, 1936 |